Nov. 19, 1935.  E. BANDOLY  2,021,280
MANOMETER
Filed Feb. 23, 1933  2 Sheets-Sheet 1
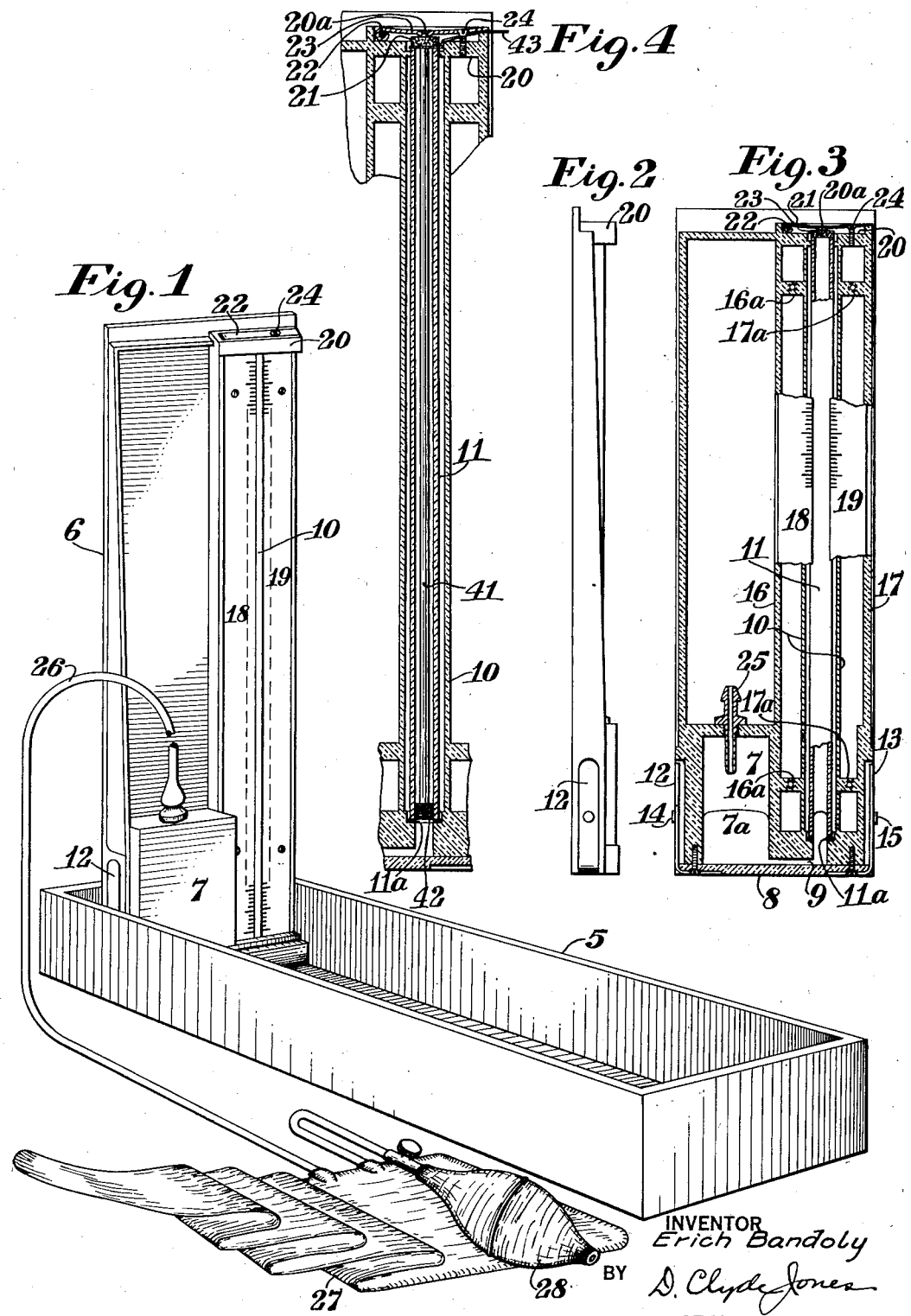
INVENTOR
Erich Bandoly
BY D. Clyde Jones
ATTORNEY

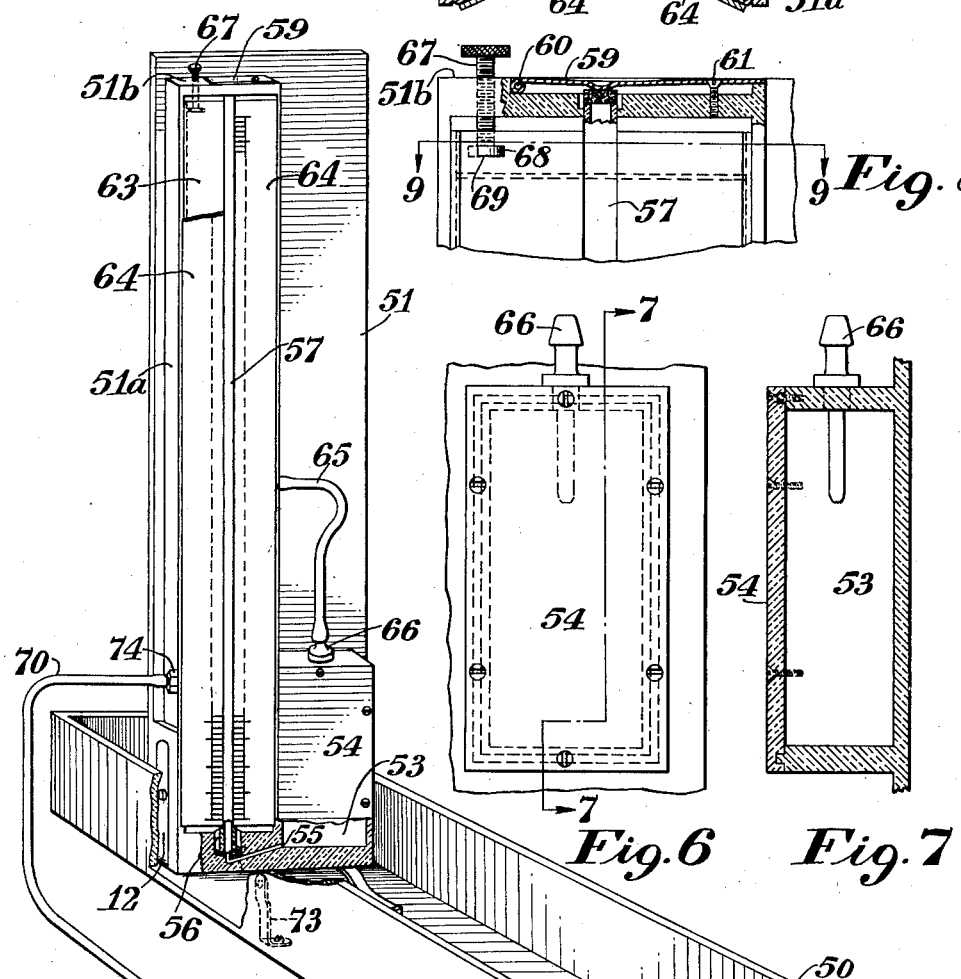

Patented Nov. 19, 1935

2,021,280

UNITED STATES PATENT OFFICE 2,021,280

MANOMETER

Erich Bandoly, Rochester, N. Y., assignor to Taylor Instrument Companies, Rochester, N. Y., a corporation of New York Application February 23, 1933, Serial No. 658,068

7 Claims. (Cl. 73—44)

This invention relates to a mercury manometer, and more particularly to a mercury sphygmomanometer.

It is important in mercury sphygmomanometers that they be compact, light in weight, sturdy in construction and free from the leakage of mercury.

In accordance with the main feature of the invention, a sphygmomanometer is provided which may be used either as a portable instrument or as a wall instrument.

A further feature includes a sphygmomanometer which is molded from material which is inert with respect to mercury.

Another feature of the invention relates to a sphygmomanometer having a novel mounting for the measuring tube whereby broken tubes may be readily replaced and yet prevent the leakage of mercury at the ends of the tube.

An additional feature relates to means for retaining the mercury in the lower end of the mercury tube during shipment, which means also serves as a cleaner for the measuring tube when the instrument is in service.

For a clearer understanding of the invention, reference is made to the drawings in which Fig. 1 is a perspective view of a sphygmomanometer of the present invention with the cover or instrument support in opened position; Fig. 2 is a side view of the cover or instrument support removed from the case; Fig. 3 is a sectional view of the cover or support shown in Fig. 2; Fig. 4 is a vertical sectional view of a fragment of the cover, showing the mounting of the scale, the measuring tube and means for closing the upper end of the measuring tube against the passage of mercury therethrough; Fig. 5 is a perspective view (with a portion of the case broken away) of a modified form of sphygmomanometer; Fig. 6 is a fragmentary view of the cover or instrument support showing the mercury reservoir formed therein; Fig. 7 is a cross-sectional view taken on the line 7—7 of Fig. 6; Fig. 8 is a detailed view of a portion of the upper end of the cover or instrument support as shown in Fig. 5; and Fig. 9 is a sectional view taken on the line 9—9 of Fig. 8.

Referring to Fig. 1, 5 designates a case having a detachable cover or instrument support 6, which cover is movable to the open position as shown where the instrument is in operative condition, or may be swung to close the case when the instrument is not in use. The case 5, as well as the cover 6, are preferably molded from a phenol condensation product. The cover has molded therein a mercury reservoir 7 for mercury 7a and has also formed therein a channel defined by the outstanding ribs 10 to receive a removable glass measuring tube 11. The lower end of this tube rests on a gasket in a circular recess 11a molded in the lower portion of the cover and communicates through a duct 9 with the reservoir. The lower part of the reservoir and the duct 9 are open to facilitate the removal of suitable core elements during the molding operation, but are normally closed by a strip 8 fastened to the lower end of the cover by screws, as shown in Fig. 3. These screws also serve to hold the springs 12 and 13 in position, which springs are provided with projections 14 and 15 to engage suitable notches (not shown) in the sides of the case whereby the projections serve as the axis of rotation for the cover. However, by pressing the upper ends of the springs 12 and 13 inwardly into the recesses in the sides of the cover, the projections 14 and 15 may be disengaged from the sides of the case so that the cover can be removed therefrom whenever it is desired to use the device as a wall instrument. The cover is also provided with ribs 16, 17 and cross ribs 16a, 17a, which ribs, together with the ribs 10, serve as a mounting for the graduated scale plates 18 and 19 in overlapping relation with the measuring tube 11. These plates may be fastened to the cross ribs in any suitable manner. It will be understood that this ribbed construction is provided to give proper supports on which to mount the scale plates, and yet keep the weight of the instrument within reasonable limits. The top portion 20 of the cover is provided with a circular recess 20a through which the measuring tube 11 may be inserted into the channel and in which recess there is mounted a filter 21 formed of material of the character described in Patent No. 1,117,601 to Porter, granted November 17, 1914. A spring 23 hinged at 22 on the cover normally engages the filter 21 forcing it downwardly against the end of the measuring tube, so that the tube engages the gasket in the recess 11a thereby preventing the mercury from leaking either at the top or bottom of the measuring tube. The spring 23 is normally held in engagement with the filter by means of a screw 24 passing through the spring into the material of the cover.

In the top of the reservoir 7 there is molded a screw-threaded opening to receive the threaded nipple 25. This nipple which extends into the reservoir to a point above the level of the mercury in any position of the instrument, serves as a connection for a flexible tube 26 communicating with the well-known cuff 27 and the inflating bulb 28.

During shipment of the instrument it is desirable to provide some means for preventing mercury 7a escaping from the measuring tube. For this purpose there is provided a light rod 41 equipped at its lower end with a series of discs 42 of soft material such as felt which closely engage the inner wall of the measuring tube to serve as a stopper when the rod is inserted therein. A strip of flexible material 43 such as cloth is fastened to the upper end of the rod 41, as shown in Fig. 4, to facilitate removal of the rod when the instrument is to be set up ready for service. It will be understood that this rod may be withdrawn by strip 43 from the measuring tube by removing screw 24 and swinging spring 22 to a vertical position. The rod 41 with its discs 42 may also serve as a convenient means for cleaning the interior of the measuring tube in the event that dirt accumulates therein during use.

The modified form of the invention shown in Figs. 5 to 9 inclusive, also includes a molded case 50 having a molded cover 51 pivotally mounted on springs such as 12 and 13 in said case, both case and cover being formed from a phenol condensation product. The cover has formed therein a mercury reservoir 53 which is molded with an open front but which is normally closed by a plate 54 screwed to the wall of the reservoir. The lower part of the reservoir communicates through a duct 55, leading to a vertically extending cylindrical recess 56. A gasket mounted in the lower part of this recess supports a glass measuring tube 57. This tube extends upwardly into a recess in the top part 51b of the cover as shown in Fig. 5 where the upper end of the measuring tube is closed against the passage of mercury by means of the filter mounted in the mentioned recess. The spring 59 pivoted at 60 and normally fastened to top piece 51b by screw 61 engages the filter to force the glass measuring tube against its lower gasket.

In the patent to S. S. Amdursky No. 1,905,782 granted April 25, 1933, the use of an air chamber for damping or smoothing out the pulsations or oscillations of the mercury during a blood pressure measurement, is disclosed. In accordance with the present invention a novel arrangement for incorporating a damping chamber in a portable instrument, is provided. As shown in Fig. 9, the damping chamber 62 is mounted back of and encloses a portion of the measuring tube 57. The front surfaces 63 of this chamber are inclined toward the tube and serve as a support for the scale plates 64 fastened thereto. The damping chamber 62 communicates with the top of the mercury reservoir 53 through the flexible tube 65 which is fastened to the nipple 66 in the reservoir wall. The damping chamber 62 is mounted between the ribs 51a of the cover and is suspended therein by the screw 67 in threaded engagement with the top part 51b of the cover. This screw at its lower end is provided with a shoulder 68 engaging a recess 69 in a flange attached to the upper part of the chamber wall. It will be understood that by the adjustment of the screw 67, the air chamber with the scale plates thereon may have limited upward or downward movement to adjust the instrument for proper zero reading. The chamber 62 also communicates through the flexible tube 70 with a well-known cuff structure 71 which is arranged to be inflated by bulb 72.

It will be noted in Fig. 5 that spring 73 extends upwardly from the case bottom so that when it is desired to close the instrument after the tube 70 has been removed, the free end of the nipple 74 engages the upper end of the spring 73 preventing the escape of mercury from the instrument.

The glass measuring tubes 11 and 57 are of uniform diameter so that in case of breakage a new tube may be substituted for the broken tube without returning the instrument to the manufacturer. The substitution of a new tube is readily effected, for it is only necessary to remove the screw from the retaining spring.

I claim:

1. In a device of the class described, a support, a reservoir thereon, a member at one end of said support having a recess therein and a duct connecting said recess and said reservoir, a transparent tube having its lower end extending into said recess, an extension at the opposite end of said support having an opening therein through which said tube may be inserted and removed from said support, said opening being in vertical alignment with said recess, and a flat horizontal strip mounted on said extension across said opening therein and serving to force said tube in the direction of said recess.

2. In a device of the class described, a support, a reservoir thereon, a member at one end of said support having a recess therein and a duct connecting said recess and said reservoir, a transparent tube having its lower end extending into said recess, an extension at the opposite end of said support having an opening therein through which said tube may be inserted and removed from said support, said opening being in vertical alignment with said recess, a filter for the passage of air but impervious to mercury, said filter being supported by an end of said tube in said opening, and a flat spring mounted on said extension across said opening and resiliently engaging said filter in a direction so that said tube is forced into said recess.

3. In a device of the class described, a support, a reservoir thereon, a transparent measuring tube communicating with said reservoir, a chamber on said support, said chamber having a recess in one of its walls to receive said measuring tube, a fluid connection from the top of said reservoir to said chamber, an inflatable cuff system in fluid connection with said chamber, and a liquid in said reservoir.

4. In a device of the class described, a support, a reservoir thereon, a transparent tube communicating with said reservoir, a chamber on said support, said chamber having a recess formed therein to receive said measuring tube, the wall of said chamber at one side thereof diverging toward said recess, a fluid connection from the top of said reservoir to said chamber, an inflatable cuff system in fluid connection with said chamber, and a liquid in said reservoir.

5. In a device of the class described, a support, a reservoir thereon, a transparent tube communicating with said reservoir, a chamber on said support, said chamber having a recess formed therein to receive said measuring tube, the wall at one side of said chamber diverging toward said recess and provided with graduations on a portion thereof, means for adjusting said chamber with respect to said support, a fluid connection from the top of said reservoir to said chamber, an inflatable cuff system in fluid connection with said chamber, and a liquid in said reservoir.

6. In a device of the class described, a support, a reservoir mounted at the lower end of said support, a transparent measuring tube having its lower end in detachable fluid connection with said reservoir, a fixed extension at the other end of said support having an opening therein to receive said tube, and a flat horizontal strip mounted on said extension across at least a portion of said opening and serving to force said tube toward the lower end of said support.

7. In a device of the class described, a support, a reservoir thereon, a member at one end of said support having a recess therein and a duct connecting said recess and said reservoir, a transparent tube having its lower end extending into said recess, an extension at the opposite end of said support having an opening therein through which said tube may be inserted and removed from said support, said opening being in vertical alignment with said recess, a filter support having a filter therein for the passage of air but substantially impervious to mercury, said filter engaging the upper end of said tube, and a flat strip mounted on said extension and extending across at least a portion of said opening and pressing said filter support and tube toward said recess.

ERICH BANDOLY.